J. F. GLASER.
DOOR HOLDING DEVICE.
APPLICATION FILED DEC. 12, 1919.

1,433,271.

Patented Oct. 24, 1922.

Inventor:
John F. Glaser.
By Jones Rain & Hinkle
Attys.

Patented Oct. 24, 1922.

1,433,271

UNITED STATES PATENT OFFICE.

JOHN F. GLASER, OF CHICAGO, ILLINOIS.

DOOR-HOLDING DEVICE.

Application filed December 12, 1919. Serial No. 344,401.

*To all whom it may concern:*

Be it known that I, JOHN F. GLASER, a citizen of the United States, residing at 318 South Canal Street, Chicago, in the county of Cook and State of Illinois, have invented certain new and useful Improvements in Door-Holding Devices, of which the following is a specification.

The invention relates to door holding devices and has a special reference to devices of this character for holding the door of an automobile open to any extent desired.

One of the objects of the invention is to provide a door holding device that will hold a door open in any desired position and which will also hold a door closed.

Another object is to provide a device of the character described that is staunch, noiseless and inexpensive.

Another object is to provide a device in which substantially all of the parts may be punched from and formed of sheet metal.

Other, further and more specific objects of the invention will become readily apparent, to persons skilled in the art, from a consideration of the following description when taken in conjunction with the drawings, wherein:—

In all the views the same reference characters are employed to indicate similar parts.

Figure 1:
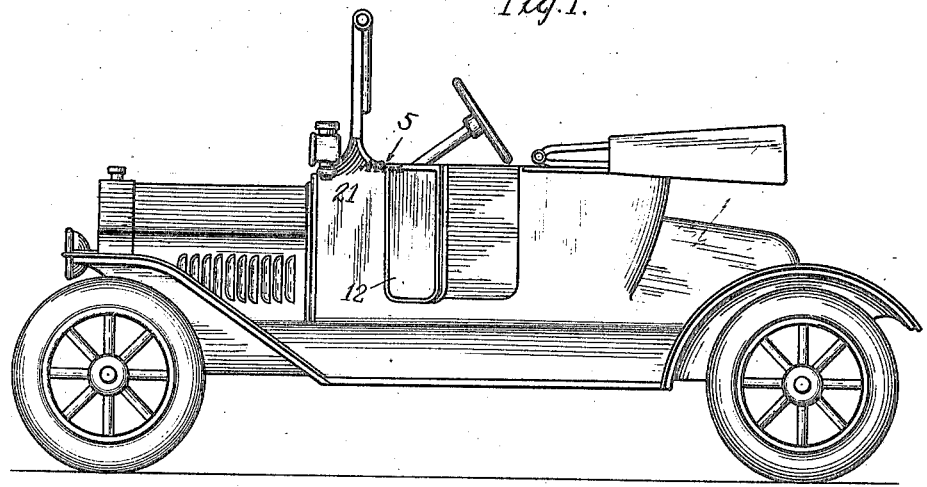
Fig. 1 represents the side elevation of an automobile showing the device in position thereon.

A bracket 5 is composed of a single piece of sheet metal bent upon itself to provide a base 6 for attaching screws 7 and having projecting, parallel arms 8 and 9 perforated for a screw or bolt 10. A similar bracket 11 designed to be attached to the door 12 is also made of a single piece of sheet metal formed into parallel arms 13 and 14 the connecting part providing a base 15 which contains openings for attaching screws 16. A slotted link 17 is pivotally secured to the bracket 11 as by pin 18 and is provided with a slot 19 enclosing the screw or bolt 10 and is the means for clamping the arms 8 and 9 into intimate contact with the link 17 to hold the device in selected position. The bracket 6 is secured to the jamb of a door or to a stationary part 21 of an automobile while the bracket 11 is secured to the door 12.

Figure 2:
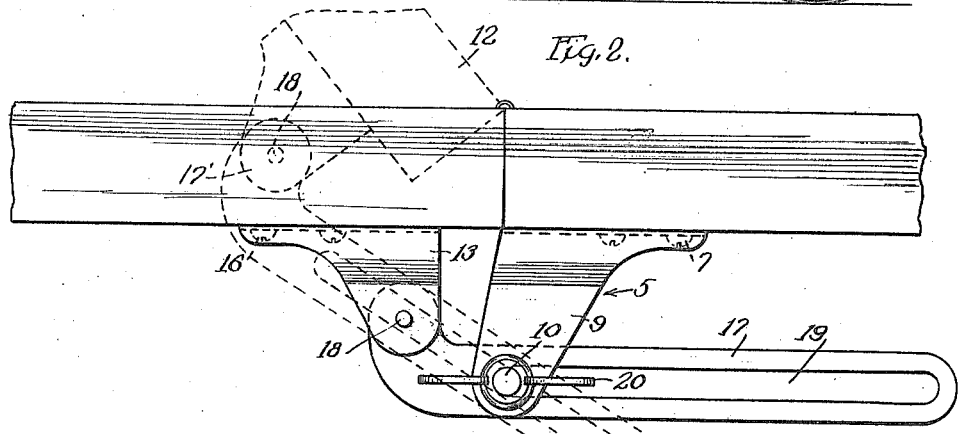
Fig. 2 is a plan view, showing in full lines the door closed and in broken lines the door open.
Figure 3:
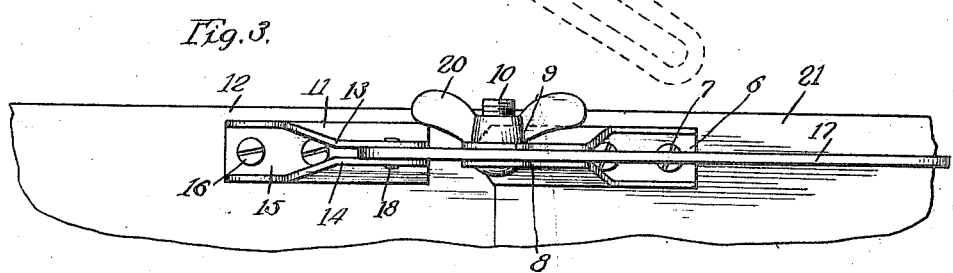
Fig. 3 is a side elevation of the device.

The operation of the device is clearly apparent. When the door is open, as shown in broken lines in Fig. 2, the link 17 will slide freely over the bolt 10 and between the arms 8 and 9 of the bracket 6 until the door is in the position desired whereupon the thumb nut 20 is tightened, the operation of which clamps the arms 8 and 9 into intimate contact with the link 17.

It is of course obvious that the device may be placed upon any type of door and perform its desired function but it is especially adaptable for automobiles, because of the fact that the parts are clamped together so as to prevent rattle. The arms 13 and 14 are held in intimate contact with the curved end 17' of the link 17 so that there is no lost motion between the parts at this joint, and the thumb nut 20 clamps the arms 8 and 9 into intimate contact with the link so that there can be no relative movement of these parts when the device is in position to hold the door open or closed. The holding device may be connected either at the top or bottom of the door, as convenience will dictate. Being small and unobtrusive, objection cannot be found to its use on account of its appearance or its size. The drawings rather exaggerate its size for the purpose of clear disclosure.

Having described my invention what I claim as new and desire to secure by Letters Patent, is:—

A door holding device comprising a door bracket for attachment to a door and having a pair of substantially parallel arms, a slotted link secured between the arms of the door bracket on a relatively fixed pivot, a jamb bracket for attachment adjacent the hinge jamb of a door and having a pair of substantially parallel arms between which the link is positioned, and a clamping screw fixed to the jamb bracket and extending through the slot in the link and acting to clamp the link rigidly between the arms of the jamb bracket.

In testimony whereof I hereunto subscribe my name.

JOHN F. GLASER.